US008372294B2

(12) United States Patent
Grøtheim

(10) Patent No.: US 8,372,294 B2
(45) Date of Patent: Feb. 12, 2013

(54) METHOD FOR CONTINUOUS USE OF A VACUUM-SET WATER KNOCK-OUT CIRCUIT INTEGRATED WITH A HYDRAULIC OIL RESERVOIR

(75) Inventor: Jens Terje Grøtheim, Drøbak (NO)

(73) Assignee: Future Engineering AS, Drobak (NO)

( * ) Notice: Subject to any disclaimer, the term of this patent is extended or adjusted under 35 U.S.C. 154(b) by 0 days.

(21) Appl. No.: 13/500,934

(22) PCT Filed: Oct. 22, 2010

(86) PCT No.: PCT/NO2010/000377
§ 371 (c)(1),
(2), (4) Date: May 9, 2012

(87) PCT Pub. No.: WO2011/049468
PCT Pub. Date: Apr. 28, 2011

(65) Prior Publication Data
US 2012/0211445 A1    Aug. 23, 2012

(30) Foreign Application Priority Data
Oct. 23, 2009    (NO) .................................. 20093214

(51) Int. Cl.
B01D 37/04    (2006.01)
B01D 17/12    (2006.01)
B01D 17/032    (2006.01)
B01D 35/147    (2006.01)
(52) U.S. Cl. ........ 210/774; 210/103; 210/104; 210/109; 210/130; 210/808; 210/175; 210/180; 95/253; 95/266; 95/287

(58) Field of Classification Search .................. None
See application file for complete search history.

(56) References Cited

U.S. PATENT DOCUMENTS

| 909,733 | A | * | 1/1909 | Zobler ......................... 210/513 |
| 1,457,153 | A | * | 5/1923 | Elliott ............................. 96/160 |
| 1,494,670 | A | * | 5/1924 | Delaney et al. ............... 210/535 |
| 1,758,376 | A | * | 5/1930 | Sawyer ........................ 166/312 |
| 2,206,835 | A | * | 7/1940 | Combs .......................... 210/115 |
| 2,398,338 | A | * | 4/1946 | Walker ......................... 516/135 |
| 2,422,555 | A | * | 6/1947 | Karlson et al. ............... 210/519 |
| 2,613,811 | A | * | 10/1952 | Archibald .................... 210/110 |
| 2,638,223 | A | * | 5/1953 | Parks ............................ 96/408 |
| 2,688,368 | A | * | 9/1954 | Rodgers et al. .............. 166/267 |
| 2,726,729 | A | * | 12/1955 | Williams ....................... 96/166 |
| 2,783,854 | A | * | 3/1957 | Lovelady et al. .............. 96/184 |
| 2,825,422 | A | * | 3/1958 | Schoenfeld .................... 96/159 |
| 2,870,860 | A | * | 1/1959 | Ray ................................ 96/168 |
| 2,996,188 | A | * | 8/1961 | Denton ......................... 210/114 |
| 3,105,855 | A | * | 10/1963 | Meyers .......................... 585/15 |
| 3,159,473 | A | * | 12/1964 | Meyers et al. ................ 62/657 |
| 3,394,530 | A | * | 7/1968 | O'Neill et al. ................. 96/159 |
| 3,425,556 | A | * | 2/1969 | Volker .......................... 210/104 |
| 3,425,913 | A | * | 2/1969 | Holden ....................... 196/14.5 |
| 3,672,127 | A | * | 6/1972 | Mayse et al. ................. 204/662 |
| 3,705,626 | A | * | 12/1972 | Glenn et al. ................. 166/267 |
| 3,709,292 | A | * | 1/1973 | Palmour ........................ 166/68 |

(Continued)

FOREIGN PATENT DOCUMENTS
GB    2197660 A    5/1988

*Primary Examiner* — Robert James Popovics
(74) *Attorney, Agent, or Firm* — Gable Gotwats

(57) ABSTRACT

The invention relates to a method for continuous use of a vacuumized water knockout circuit integrated with a contaminated hydraulic-oil reservoir.

1 Claim, 1 Drawing Sheet

U.S. PATENT DOCUMENTS

| | | | | |
|---|---|---|---|---|
| 3,759,324 A | * | 9/1973 | Mecusker | 166/75.12 |
| 3,782,463 A | * | 1/1974 | Palmour | 166/68 |
| 3,802,501 A | * | 4/1974 | Mecusker | 166/75.12 |
| 3,804,252 A | * | 4/1974 | Rishel | 210/800 |
| 3,971,719 A | * | 7/1976 | Peters | 210/104 |
| 4,010,012 A | * | 3/1977 | Griffin et al. | 96/159 |
| 4,073,734 A | * | 2/1978 | Lowrie | 96/184 |
| 4,132,651 A | * | 1/1979 | deJong | 210/522 |
| 4,233,154 A | * | 11/1980 | Presley | 210/800 |
| 4,257,895 A | * | 3/1981 | Murdock | 210/243 |
| 4,304,570 A | * | 12/1981 | Kleeberg et al. | 23/293 S |
| 4,435,196 A | * | 3/1984 | Pielkenrood | 96/184 |
| 4,596,136 A | * | 6/1986 | Zacharias | 73/61.45 |
| 4,604,196 A | * | 8/1986 | Lowrie et al. | 96/176 |
| 4,673,500 A | * | 6/1987 | Hoofnagle et al. | 210/307 |
| 4,757,618 A | * | 7/1988 | Mihalov | 34/73 |
| 4,796,676 A | * | 1/1989 | Hendershot et al. | 141/83 |
| 4,919,777 A | * | 4/1990 | Bull | 204/563 |
| 4,939,817 A | * | 7/1990 | Weber | 23/308 S |
| 5,132,011 A | * | 7/1992 | Ferris | 96/184 |
| 5,149,344 A | * | 9/1992 | Macy | 96/159 |
| 5,154,538 A | * | 10/1992 | Bockle | 210/104 |
| 5,204,000 A | * | 4/1993 | Steadman et al. | 210/519 |
| 5,240,617 A | * | 8/1993 | Hopf | 210/703 |
| 5,256,171 A | * | 10/1993 | Payne | 95/19 |
| 5,326,474 A | * | 7/1994 | Adams et al. | 210/519 |
| 5,415,776 A | * | 5/1995 | Homan | 210/519 |
| 5,502,266 A | * | 3/1996 | Hodson | 585/802 |
| 5,654,502 A | * | 8/1997 | Dutton | 73/152.18 |
| 5,661,248 A | * | 8/1997 | Bernicot et al. | 73/861.04 |
| 5,837,152 A | * | 11/1998 | Komistek et al. | 210/801 |
| 5,857,522 A | * | 1/1999 | Bradfield et al. | 166/267 |
| 5,865,992 A | * | 2/1999 | Edmondson | 210/180 |
| 5,900,137 A | * | 5/1999 | Homan | 210/85 |
| 5,928,519 A | * | 7/1999 | Homan | 210/741 |
| 5,965,029 A | * | 10/1999 | Simon et al. | 210/663 |
| 6,041,668 A | * | 3/2000 | Guieze et al. | 73/863.03 |
| 6,099,742 A | * | 8/2000 | Komistek | 210/774 |
| 6,110,383 A | * | 8/2000 | Coombs et al. | 210/732 |
| 6,187,079 B1 | * | 2/2001 | Bridger | 96/179 |
| 6,214,092 B1 | * | 4/2001 | Odom et al. | 95/253 |
| 6,214,220 B1 | * | 4/2001 | Favret, Jr. | 210/188 |
| 6,533,929 B2 | * | 3/2003 | Binsfeld et al. | 210/180 |
| 6,537,458 B1 | * | 3/2003 | Polderman | 210/801 |
| 6,773,605 B2 | * | 8/2004 | Nyborg et al. | 210/741 |
| 6,881,329 B2 | * | 4/2005 | Amado et al. | 210/96.1 |
| 6,989,103 B2 | * | 1/2006 | Mohsen et al. | 210/708 |
| 7,014,757 B2 | * | 3/2006 | Rhodes | 210/188 |
| 7,024,951 B2 | * | 4/2006 | Germond | 73/863.21 |
| 7,347,945 B2 | * | 3/2008 | Amado et al. | 210/739 |
| 7,611,635 B2 | * | 11/2009 | Chieng et al. | 210/744 |
| 7,617,940 B2 | * | 11/2009 | Gramme et al. | 210/519 |
| 7,731,037 B2 | * | 6/2010 | Frazier et al. | 210/532.1 |
| 8,025,806 B2 | * | 9/2011 | Lehman et al. | 210/747.1 |
| 8,133,300 B1 | * | 3/2012 | Gonsalves et al. | 95/19 |
| 8,236,182 B2 | * | 8/2012 | Lehman et al. | 210/747.1 |
| 2002/0157997 A1 | * | 10/2002 | Binsfeld et al. | 210/180 |
| 2002/0162806 A1 | * | 11/2002 | Komistek | 210/788 |
| 2003/0159986 A1 | * | 8/2003 | Amado et al. | 210/521 |
| 2003/0217956 A1 | * | 11/2003 | Mohsen et al. | 210/188 |
| 2004/0007131 A1 | * | 1/2004 | Chitty et al. | 95/253 |
| 2004/0011748 A1 | * | 1/2004 | Amado et al. | 210/800 |
| 2004/0112150 A1 | * | 6/2004 | Germond | 73/863.21 |
| 2010/0248043 A1 | * | 9/2010 | Turner et al. | 429/410 |
| 2011/0089013 A1 | * | 4/2011 | Sakurai et al. | 201/2 |
| 2012/0211445 A1 | * | 8/2012 | Grotheim | 210/808 |

* cited by examiner

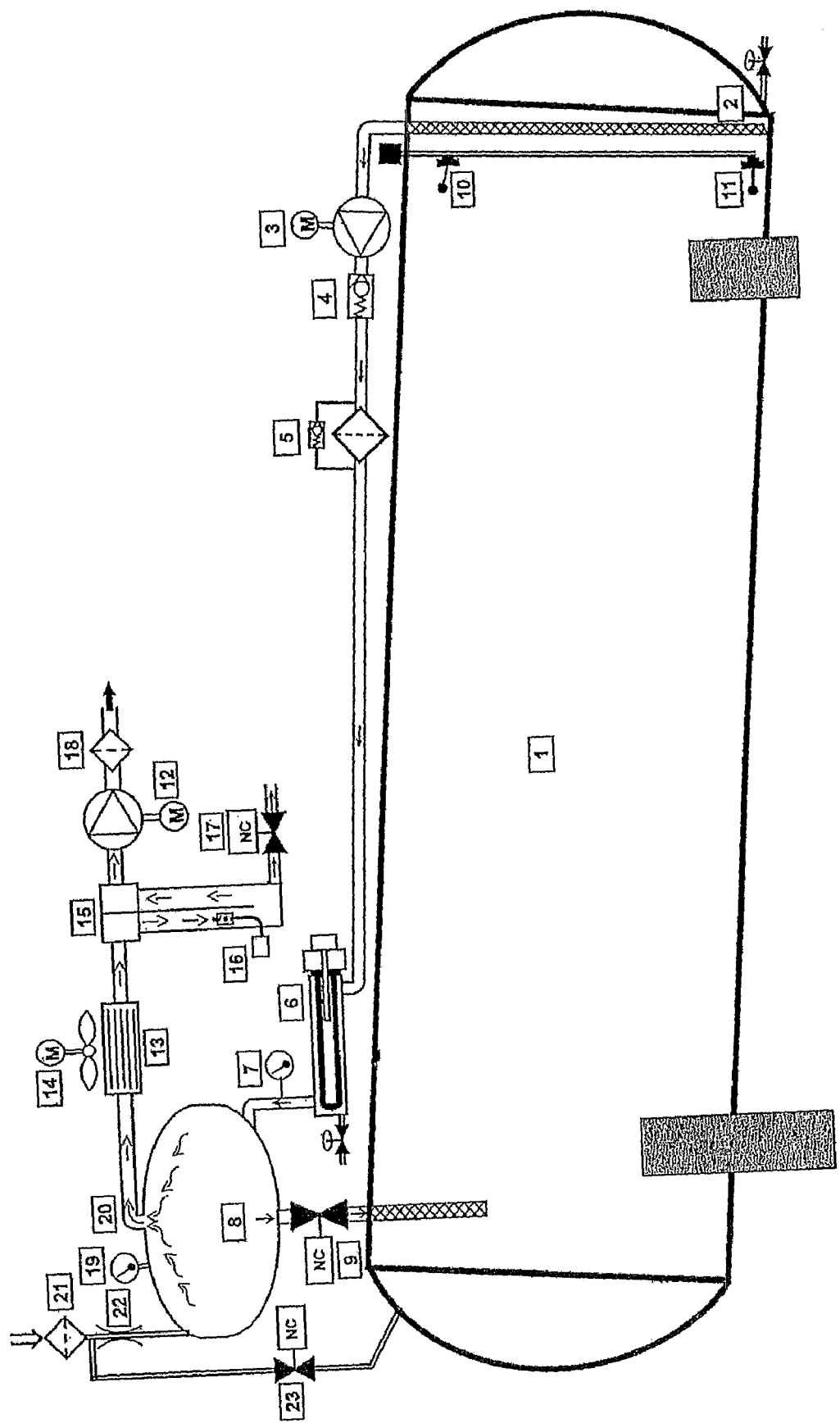

METHOD FOR CONTINUOUS USE OF A VACUUM-SET WATER KNOCK-OUT CIRCUIT INTEGRATED WITH A HYDRAULIC OIL RESERVOIR

CROSS-REFERENCE TO RELATED APPLICATIONS

This application is the U.S. National Phase of PCT Patent Application No. NO2010/000377 filed 22 Oct. 2010, which claims priority to Norwegian Patent Application No. 20093214 filed 23 Oct. 2009, which are incorporated herein by reference.

BACKGROUND OF THE INVENTION

The invention relates to a method for the continuous use of a vacuumized water knockout circuit integrated with a hydraulic oil reservoir, as it is indicated in the introduction to the accompanying claim 1.

From the patent literature is cited as background art:

GB 2197660 A (see U.S. Pat. No. 4,757,618) is dealing with the dewatering of oil. The process includes an upstream sedimentation tank, an evaporation tank and a downstream condenser tank.

Standard water knockouts for contaminated hydraulic fluid available in the market are not optimally adapted for integration into plants requiring large capacity, as standard plants have a given capacity and, in many cases, will be inadequate for the purpose. Using several standard water knock-outs is an alternative but entails large costs.

Water knockout units for hydraulic or lubricating oil available in the market are designed to function independently and are normally used as mobile units. Such a plant will normally be of a very compact construction. The equipment is used to dehydrate oil that is taken from an oil drum or a tank. Possibly, the equipment may be integrated into a separate circuit in a hydraulic-oil or lubricating-oil system to remove water from the tanks.

This type of equipment is common in various workshop applications, but models have also been developed that are ATEX-certified for use in explosive zones aboard vessels or fixed oil and gas field platforms, either as independent units or intended for integration into other equipment.

The invention has for its object to remedy or reduce at least one of the drawbacks of the prior art, or at least provide a useful alternative to the prior art.

The object is achieved through features which are specified in the description below and in the claims that follow.

When water separation takes place in a larger plant, it is possible to disregard the need for the equipment to function independently, which is necessary when the water knockouts are sold as independent units. By the tank being vacuumized, the fluid may be circulated freely through the system, which will bring the dehydration time for the total volume down in relation to that achievable with the prior art.

An alternative application of the system is the vacuumizing of large amounts of hydraulic fluid or lubricating oil for use in underwater umbilicals so that air is removed from the oil before it is pumped into the umbilical. Such media often contain 8-10% air on delivery from the producer. After a long time, this may lead to degradation of the hydraulic oil because of oxidation and bacterial growth. In other applications in which there is a great pressure drop across valves, explosive decompression of the air in the oil may give increased wear. Vacuumizing the oil will help to counter these problems.

A common ATEX-certified water knockout is, for example, the NOR-purifier PEX-03. Such a water knockout has a separate oil column in which the oil is sucked into the system by means of underpressure from a vacuum pump connected to the column. The oil is preheated by a heating element before the oil goes via a choke valve into the oil column, which has been vacuumized, for treatment. The oil is mixed with atmospheric air and rises through an inner pipe at the centre of the column. The air is heated by the oil in the inner pipe, expands and dries. This leads to free and bound water in the oil being attracted to the air bubbles and carried in the oil stream up the pipe. The vacuum in the oil column leads to the boiling point of the water being lowered, so that the water turns into water vapour at the surface. The oil is spread across a large number of spherical balls which create a large surface, from which any remaining water evaporates to the surface. The water vapour is extracted from the column and continues via a fanned vapour cooler to a condenser with a vapour trap and collector for separated water. The cleaned oil is pumped forward out of the bottom of the oil column.

The process in a standard water knockout is less controllable than that achievable if the entire hydraulic-oil reservoir is integrated with the water knockout plant by them being placed under a joint vacuum. In relation to the prior art, with this solution, problems with controlling the process relative to atmospheric pressure will be avoided. In practice this means that foaming of the hydraulic fluid may more easily be avoided.

The method of using the process of the application means the entire reservoir volume being treated continuously, by the hydraulic fluid being circulated freely through the plant, which will bring the dehydration time for the total volume down in relation to that achievable with the prior art in which the hydraulic fluid runs through a treatment column before it is pumped out of the water knockout.

By integrating a customized water knockout of sufficient capacity into the plant, a customized solution is available when there is a need for a larger water knockout capacity than what can be provided by the largest standard unit available in the market.

A joint vacuum in a fluid-treatment column and the contaminated hydraulic-oil reservoir gives better control of the process, and foaming is avoided.

A fully integrated solution makes good use of space, and by the water knockout function being combined with the hydraulic-oil reservoir, there will be continuous circulation of the fluid through the plant and thereby a more efficient process.

With advantage, the control system for the fluid treatment unit may be combined with other control equipment which forms part of the total plant.

The present invention relates to a method of continuously using a vacuumized water knockout circuit integrated with a reservoir of contaminated hydraulic oil, and the method is characterized by the characteristics set out in claim 1.

In what follows is described an example of a preferred embodiment which is visualized in the accompanying drawing, in which:

FIG. 1 shows a sectional side view of a process plant with a reservoir tank, circulation circuit, vacuum outlet, condensate knockout and atmospheric-air inlet.

In the FIGURE the reference numeral 1 indicates a level-controlled tank, also called a hydraulic-oil reservoir. Further, an outlet 2 for hydraulic oil from the tank 1, a charge pump 3 for hydraulic oil, a check valve 4, a circulation filter 5 with a bypass, a heating element 6 with drainage, a temperature control 7 for the hydraulic oil, a treatment column 8, a solenoid-operated column oil valve 9 which is normally closed, a level control 10 for the indication of a high level, a level control 11 for the indication of a low level, a vacuum pump 12, a vapour cooler 13, a cooling fan 14, condensate trap 15, a level control 16 for separated water, a drain 17 for separated water (normally closed), a gas filter 18 for vacuum suction, an underpressure control 19, a column outlet 20 for vapour, an air filter 21 for the intake of atmospheric air, a fixed air nozzle 22 and a solenoid-operated control/safety valve 23 (normally closed) are shown.

The present method is based on the continuous, vacuumized circulation of hydraulic fluid through the tank 1 and an associated circulation circuit for water knockout. The process is kept under vacuum up to typically 98%. Contaminated hydraulic oil is pumped by way of the charge pump 3 from the lowermost portion of the inclined tank 1 through the circulation filter 5 with a bypass. Then the oil passes through the heating element 6 which ensures a correct treatment temperature of 55-60° C. in the treatment column 8, in which the moisture is extracted from the oil. The oil runs back into the tank 1 via the oil valve 9. The latter has the function of protecting the treatment column 8 by alarm functions or shut-offs, for instance in cases of foaming. The oil level of the tank 1 is controlled and safeguarded by the level controls 10, 11.

The vacuum pump 12 keeps the treatment column 8 at underpressure of up to typically 98%. In operation the tank 1 has the same underpressure as the column 8. A continuous oil flow, together with temperature and underpressure control, results in the water vapour being drawn towards the vacuum pump 12 through the vapour cooler 13 into the condensate trap 15. Gases are evacuated continuously from the vacuum pump 12 through the gas filter 18. The condensate trap 15 has level-controlled water collection 16 which is discharged automatically via the valve 17 when the level is reached.

Air is supplied via the air filter 21 into the treatment column 8 through the fixed nozzle 22 to ensure the continuous transport of vapour out of the column 8. The valve 23 controls and safeguards system functions with respect to pressure.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. A method for the continuous use of a vacuumized water knockout circuit integrated with a contaminated hydraulic-oil reservoir (1), said method comprising the following steps:
   - by means of a vacuum pump (12), keeping both a treatment column (8) and the hydraulic-oil reservoir (1) vacuumized;
   - by means of a pump (3), pumping the contaminated hydraulic oil up from a lower portion of an inclined tank (1) through a circulation filter (5) to a heating element (6) and further to the treatment column (8) in which the moisture is extracted from the oil;
   - by means of the vacuum pump (12) and controlled oil flow, temperature and underpressure, drawing the water vapor continuously through a vapor cooler (13) into a condensate trap (15) which is emptied automatically via a valve (17);
   - evacuating gases continuously from the vacuum pump (12) via a gas filter (18); and
   - continuously transporting vapor out of the treatment column (8) by supplying air via an air filter (21) through a fixed nozzle (22), a valve (23) controlling and safeguarding system functions with respect to pressure.

\* \* \* \* \*